United States Patent
Baker

(10) Patent No.: US 6,259,053 B1
(45) Date of Patent: Jul. 10, 2001

(54) METHOD AND APPARATUS FOR CONTROLLING THE POSITION AND POWER OF ELECTRODES IN AN ELECTRIC-DISCHARGE TEXTURING MACHINE

(75) Inventor: James W. Baker, St. Clair Shores, MI (US)

(73) Assignee: Modern Hard Chrome Service Company, Warren, MI (US)

( * ) Notice: Subject to any disclaimer, the term of this patent is extended or adjusted under 35 U.S.C. 154(b) by 0 days.

(21) Appl. No.: 09/259,824

(22) Filed: Mar. 1, 1999

(51) Int. Cl.[7] .................................................. B23H 1/02
(52) U.S. Cl. ..................... 219/69.13; 219/69.16; 219/69.18
(58) Field of Search ............................ 219/69.14, 69.16, 219/69.17, 69.13, 69.18, 69.11, 69.2

(56) References Cited

U.S. PATENT DOCUMENTS 4,152,569 * 5/1979 Bell, Jr. et al. .................. 219/69.16

FOREIGN PATENT DOCUMENTS 62-15015 * 1/1987 (JP) .................................. 219/69.16

* cited by examiner

*Primary Examiner*—Geoffrey S. Evans
(74) *Attorney, Agent, or Firm*—Brooks & Kushman P.C.

(57) ABSTRACT

A method and apparatus for controlling the position and power of electrodes in an electric-discharge texturing (EDT) machine for texturing a roll includes an actuator for moving an electrode away from and towards a roll to be textured to maintain a desired spacing between the electrode and the roll. The actuator is controlled with a different gain depending upon whether the electrode is to be moved towards or away from the roll. A power source applies a voltage to the electrode for promoting a spark between the electrode and the roll to remove particles from the roll. The power source is controlled to apply the voltage to the electrode until a spark is initiated and then maintains the voltage for a selected time duration after spark initiation to provide a spark having the selected time duration. The power source is further controlled such that voltages applied to a plurality of electrodes are sequenced in a selected fashion.

3 Claims, 4 Drawing Sheets

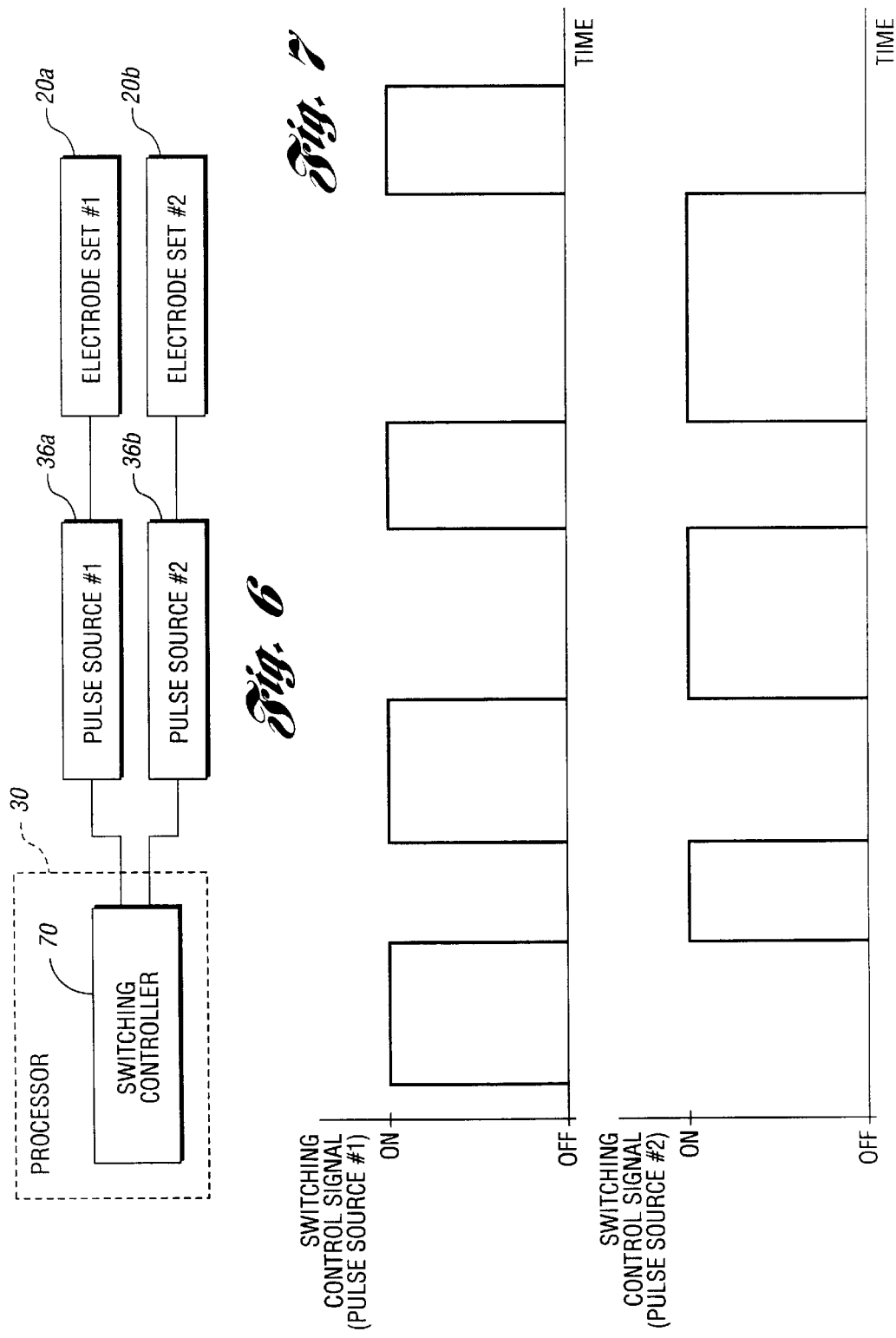

METHOD AND APPARATUS FOR CONTROLLING THE POSITION AND POWER OF ELECTRODES IN AN ELECTRIC-DISCHARGE TEXTURING MACHINE

TECHNICAL FIELD

The present invention relates to a method and apparatus for controlling the position and power of electrodes in an electric-discharge texturing machine.

BACKGROUND ART

Electric-discharge machining which is conventionally referred to as EDM has been performed by generating a voltage between an electrode and a workpiece through a dielectric fluid such that a spark momentarily generated removes a portion of the workpiece surface to perform machining. EDM has more recently evolved into electric-discharge texturing (EDT) wherein the surface of a workpiece is textured. For example, rolls used in steel mills to roll steel that is to be painted cannot be too smooth or the paint adhesion will be improper. Texturing of the rolls provides the rolled steel with a textured surface to which paint adheres better. This texturing is performed by an EDT apparatus wherein a head having a bank of electrodes traverses the roll surface as the roll rotates. Actuators move the electrodes towards and away from the roll so as to achieve the correct gap between the electrodes and the roll. The actuators ensure that the electrodes are properly spaced with respect to the roll surface so as to be close enough to generate momentary sparks through dielectric fluid, but not too close so as to generate a continuous current flow without any sparks to perform the texturing operation.

A problem with a typical EDT apparatus is that the actuators are controlled with the same gain irrespective of whether the electrodes are to be moved toward or away from the roll. Using the same gain equally weights open and short circuited voltage conditions at the interface between the electrodes and the roll interface. This is disadvantageous because the difference in magnitude between the voltage associated with an open circuit condition and a discharge voltage is typically much larger than the difference in magnitude between the voltage associated with a short circuit condition and the discharge voltage. The discharge voltage is the voltage between the electrodes and the roll when sparking occurs.

Another problem with a typical EDT apparatus is that the spark periods during discharge are inconsistent. This occurs because the power switching control in the typical EDT apparatus switches on and off the power supply with a constant pulse train. Using a constant pulse train does not take into account that the time between pulse application and spark initiation varies depending upon operating conditions. In essence, the resultant spark period is variable depending upon the period between pulse application and spark initiation and a typical EDT apparatus does not account for this variability. The uneven spark period is a source particularly troublesome in EDT where consistent surface finishes are sought.

A further problem with a typical EDT apparatus is that of haphazard sequencing between power channels. An EDT apparatus includes numerous independently operating power supplies. To maintain consistency, the power output current must be the same across all power supplies. This is traditionally accomplished by generating a central on-off time control pulse train and distributing it to all the power supplies. This haphazard sequencing causes back electromotive forces to be generated as the power system is fully loaded at one time instant and then has no load at all at another time instant.

DISCLOSURE OF INVENTION

Accordingly, it is an object of the present invention to provide a method and apparatus for an electric-discharge texturing (EDT) machine in which the actuators for moving the electrodes are controlled with different gains depending upon whether the electrodes are to be moved toward or away from the roll.

It is another object of the present invention to provide a method and apparatus for an EDT machine in which the actuators for moving the electrodes have a forward gain if the electrodes are to be moved toward the roll and a reverse gain if the electrodes are to be moved away from the roll.

It is a further object of the present invention to provide a method and apparatus for an EDT machine in which the spark periods during discharge are consistent.

It is still a further object of the present invention to provide a method and apparatus for an EDT machine in which pulse application is continued until discharge and then terminated after the expiration of a selected discharge period.

It is still another object of the present invention to provide a method and apparatus for an EDT machine in which the sequencing between power channels is synchronized to minimize the power load of the EDT machine at any given time.

It is still yet another object of the present invention to provide a method and apparatus for an EDT machine in which the on period of a power channel is synchronized to start a selected time period after any other power channel has been turned off.

In carrying out the above objects and other objects, the present invention provides an electric-discharge texturing (EDT) apparatus for texturing a roll. The apparatus includes an electrode and an actuator associated with the electrode for moving the electrode away from and towards the roll to maintain a desired spacing between the electrode and the roll. A power source applies a voltage to the electrode for promoting a spark between the electrode and the roll to remove particles from the roll and produce a textured finish thereto. The spark between the electrode and the roll occurs when spacing between the electrode and the roll is equal to a sparking gap while voltage is being applied to the electrode. A gap voltage monitor is operable with the electrode to provide a gap voltage monitor signal indicative of the voltage between the electrode and the roll. A processor determines the spacing between the electrode and the roll from the gap voltage monitor signal. The processor is operable with the actuator to move the electrode away from and towards the roll to increase and decrease the spacing between the electrode and the roll until the spacing between the electrode and the roll is equal to the sparking gap. The processor controls the actuator to move the electrode at different speeds as a function of the spacing between electrode and the roll with respect to the sparking gap.

Further, in carrying out the above objects and other objects, the present invention provides another EDT apparatus for texturing a roll. This apparatus includes an electrode and a power source. The power source applies a voltage pulse to the electrode for promoting a spark between the electrode and the roll. A gap voltage monitor is operable with the electrode to provide a gap voltage monitor signal indicative of the voltage between the electrode and the roll. A processor controls the power source to apply a voltage pulse to the electrode and processes the gap voltage monitor signal to determine when a spark is promoted between the electrode and the roll. The processor controls the power source to apply the voltage pulse until spark initiation and then controls the power source to maintain the voltage pulse for a selected time duration after spark initiation to provide a spark having the selected time duration between the electrode and the roll.

Still further, in carrying out the above objects and other objects, the present invention provides a further EDT apparatus for texturing a roll. This apparatus includes first and second electrodes. First and second power sources apply voltages to the respective first and second electrodes for promoting an electrical discharge between the first electrode and the roll to remove particles from the roll. A switching controller is operable with the first and second power sources for applying respective voltages to the first and second electrodes. The switching controller controls the first and second power sources such that the first power source applies a voltage to the first electrode while the second power source is off and the second power source applies a voltage to the second electrode while the first power source is off.

The objects, features, and advantages of the present invention are readily apparent from the following detailed description of the best mode for carrying out the present invention when taken in connection with the accompanying drawings.

BRIEF DESCRIPTION OF DRAWINGS

FIG. 6 is a block diagram illustrating the operation of the processor controlling multiple pulse sources of the EDT machine in accordance with the present invention; and FIG. 7 are graphs illustrating the switching control signals from the processor for the respective pulse sources shown in FIG. 6.

BEST MODE FOR CARRYING OUT THE INVENTION

Figure 1:
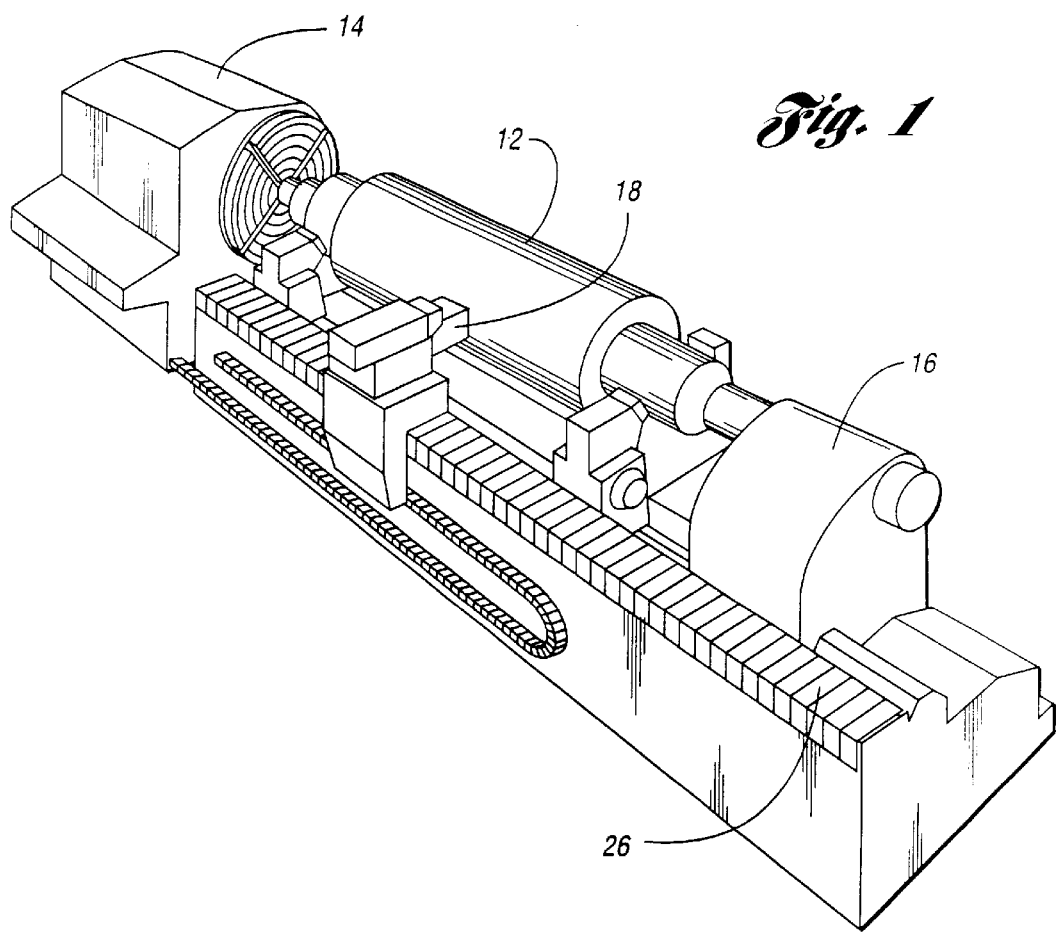
FIG. 1 is a perspective view of an electrical-discharge texturing (EDT) machine in accordance with the present invention mounted adjacently to the roll surface of a mill roll.
Figure 2:
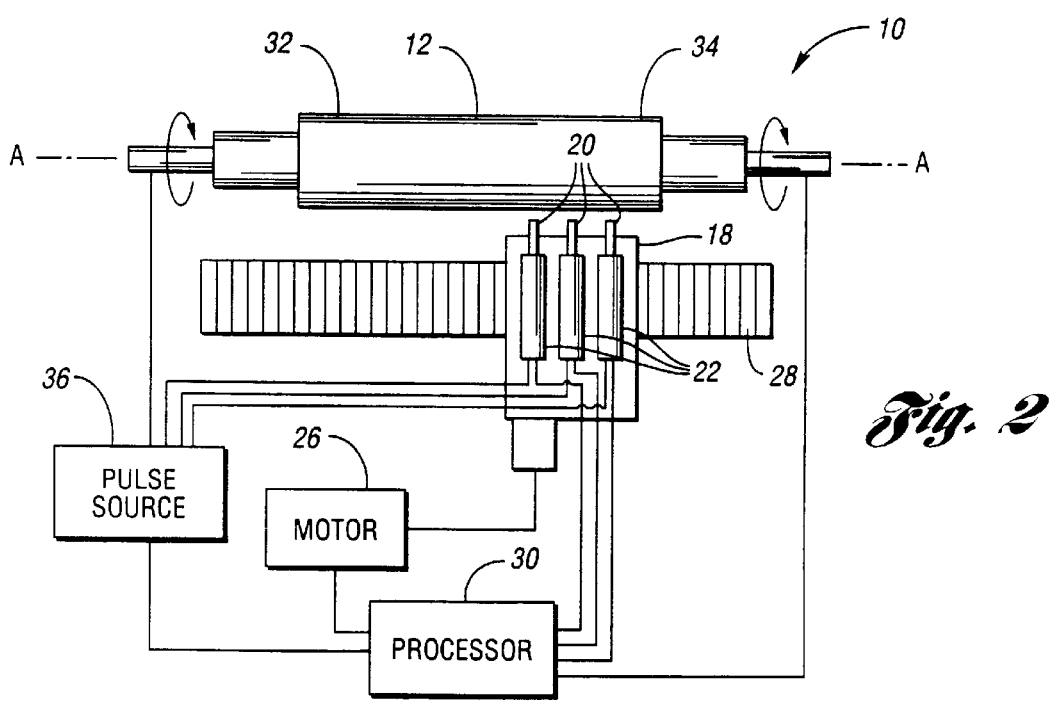
FIG. 2 is an overall block diagram of the EDT machine.

Referring now to FIGS. 1 and 2, an electrical-discharge texturing (EDT) machine 10 in accordance with the present invention is shown. EDT machine 10 textures the roll surface of roll 12 which lies horizontally for rotation about its longitudinal axis between a head stock 14 driven by an electric motor (not shown) over a controlled range of speeds and an idler tail stock 16 of a lathe-type machine.

EDT machine 10 includes a head 18 having a plurality of electrodes 20. Each of electrodes 20 has an associated actuator 22. Actuators 22 are driven to move electrodes 20 towards and away from roll 12 in a direction perpendicular to the roll axis A. Actuators 22 move electrodes 20 to maintain a proper gap spacing between roll 12 and the electrodes during the texturing process. A motor 26 drives head 18 longitudinally of the roll 12, i.e., in a direction parallel to the roll axis A, on a track 28.

A processor 30 controls the rotation of roll 12 about the roll axis A. As roll 12 rotates, processor 30 controls motor 26 to move head 18 longitudinally of the roll such that electrodes 20 traverse the roll surface from one roll end 32 to the other roll end 34. A pulse source 36 is electrically individually connected between roll 12 and each of electrodes 20 to provide an electrical voltage pulse to generate a spark for performing the texturing operation. A spark is an electrical discharge between electrodes 20 and roll 12. Processor 30 controls pulse source 36 to control the duration and on and off times of the voltage pulses. Processor 30 further controls actuators 22 to move electrodes 20 towards and away from roll 12 to maintain the proper gap spacing to ensure that the sparks are generated between the electrodes and the roll. To maintain the proper spacing of electrodes 20 with respect to roll 12, processor 30 employs a servo control algorithm.

Figure 3:
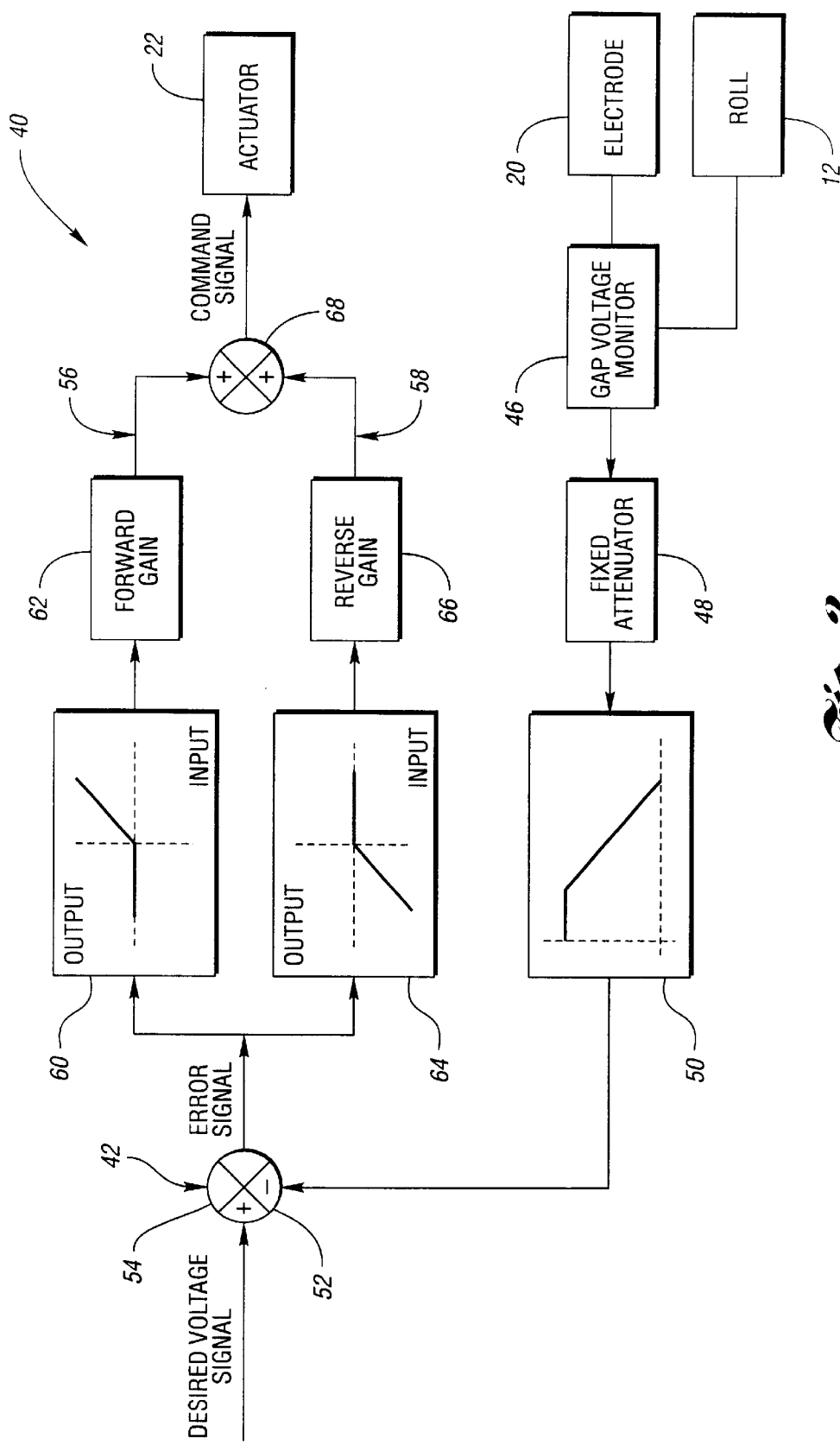
FIG. 3 is a block diagram of a servo control system for controlling the position of the electrodes in the EDT machine in accordance with the present invention.

Referring now to FIG. 3, processor 30 includes a servo control system 40 for performing the servo control algorithm in accordance with the present invention. Servo control system 40 includes a summing junction 42. Summing junction 42 determines the difference between a desired voltage signal and an actual voltage signal to generate an error signal at an output 44. The desired voltage signal is indicative of the voltage between electrode 20 and roll 12 when the correct gap is between the electrode and the roll and sparking occurs. The correct gap, or spark gap spacing between electrode 20 and roll 12, is typically on the order of 0.025 mm. At this distance, the break-down voltage of the dielectric fluid is reached and sparks flow between electrode 20 and roll 12.

The actual voltage signal is indicative of the average over time of the actual voltage between electrode 20 and roll 12. As an example, the actual voltage falls within a range such as 300 volts with an open circuit condition and roughly zero volts with a short circuit condition. With an open circuit condition, the spacing between electrode 20 and roll 12 is larger than the correct gap. With a short circuit condition, the spacing between electrode 20 and roll 12 is smaller than the correct gap as the electrode and roll may touch. The actual voltage is about thirty volts at a sparking circuit condition which occurs when the spacing between electrode 20 and roll 12 is equal to the spark gap. Thus, the desired voltage is also equal to thirty volts.

Servo control system 40 controls actuator 22 to move electrode 20 such that the error signal is zero. The error signal is zero when the spacing between electrode 20 and roll 12 is equal to the spark gap and the actual voltage is equal to the desired voltage. As the process continues, electrode 20 is worn away thereby increasing the gap distance. In addition to wear, other conditions in the gap such as the presence of debris and roll surface inconsistencies cause the gap distance to change. These conditions are detected as the actual voltage changes. Consequently, servo control system 40 operates to drive electrode 20 towards and away from roll 12 until the required sparking voltage level is achieved. If electrode 20 is moved too close to roll 12, the actual voltage reduces to a level at which a short could occur. Consequently, servo control system 40 operates to move electrode 20 away from roll 12.

Servo control system 40 includes a gap voltage monitor 46 to monitor the actual voltage between electrode 20 and roll 12. Gap voltage monitor 46 provides the actual voltage to a fixed attenuator 48. Fixed attenuator 48 attenuates the actual voltage down to an electronic voltage level on the order of volts to generate the actual voltage signal. A programmable filter 50 then filters the actual voltage signal to provide fine tuning of the response of servo control system 40. Programmable filter 50 is programmable to enable an operator to texture the roll differently. For instance, programmable filter 50 can be programmed to get a slow or fast servo response. Preferably, programmable filter 50 is a low pass filter. Programmable filter 50 is shown downstream of summing junction 42. However, programmable filter 50 may be placed upstream of summing junction 42.

Programmable filter 50 provides the filtered actual voltage signal to a first input 52 of summing junction 42. A second input 54 of summing junction 42 receives the desired voltage signal. As indicated above, summing junction 42 subtracts the actual voltage signal from the desired voltage signal to generate the error signal. The error signal may be positive or negative depending upon whether the desired voltage signal is larger or smaller than the actual voltage signal.

The error signal is provided to both a forward gain branch 56 and a reverse gain branch 58. Forward gain branch 56 includes a positive voltage rectifier 60 and a forward gain stage 62. Similarly, reverse gain branch 58 includes a negative voltage rectifier 64 and a reverse gain stage 66. Positive and negative voltage rectifiers 60 and 64 only allow error signals having the respective polarities to pass. For instance, if the error signal is positive then positive voltage rectifier 60 allows the error signal to pass to forward gain stage 62 while negative voltage rectifier 64 prevents the error signal from passing to reverse gain stage 66. Similarly, if the error signal is negative then negative voltage rectifier 64 allows the error signal to pass to reverse gain stage 66 while positive voltage rectifier 60 prevents the error signal from passing to forward gain stage 62.

Forward and reverse gain stages 62 and 66 have different programmable gains to weight the response of actuator 22 in moving electrode 20 differently as desired. For instance, forward gain stage 62 may have a large gain such that servo control system 40 acts to quickly move electrode 20 toward roll 12. Reverse gain stage 66 may have a low gain such that servo control system 40 acts to slowly move electrode 20 away from roll 12. Thus, different gains can be set for cases where servo control system 40 is moving electrode 20 towards or away from roll 12.

The outputs of forward and reverse gain stages 62 and 66 are summed by a summing junction 68. One of the outputs of the gain stages will be zero depending upon the polarity of the error signal. The other output of the gain stages will be the error signal multiplied by the appropriate gain. For example, if the error signal from output 44 is positive, then summing junction 68 receives a forward gain error signal from forward gain branch 56. If the error signal from output 44 is negative, then summing junction 68 receives a reverse gain error signal from reverse gain branch 58.

In response to either the forward or reverse gain signals, summing junction 68 generates a command signal. The command signal is indicative of the position that electrode 20 needs to move to make the spacing between the electrode and roll 12 equal to the spark gap. Summing junction 68 provides the command signal to actuator 22 which moves electrode 20 in response thereto.

Figure 4:
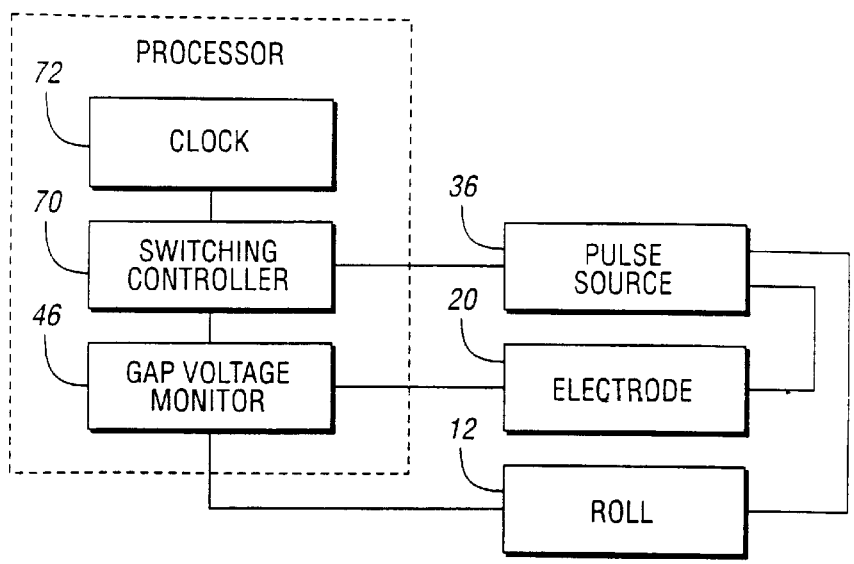
FIG. 4 is a block diagram illustrating the operation of the processor and pulse source of the EDT machine in accordance with the present invention.
Figure 5:
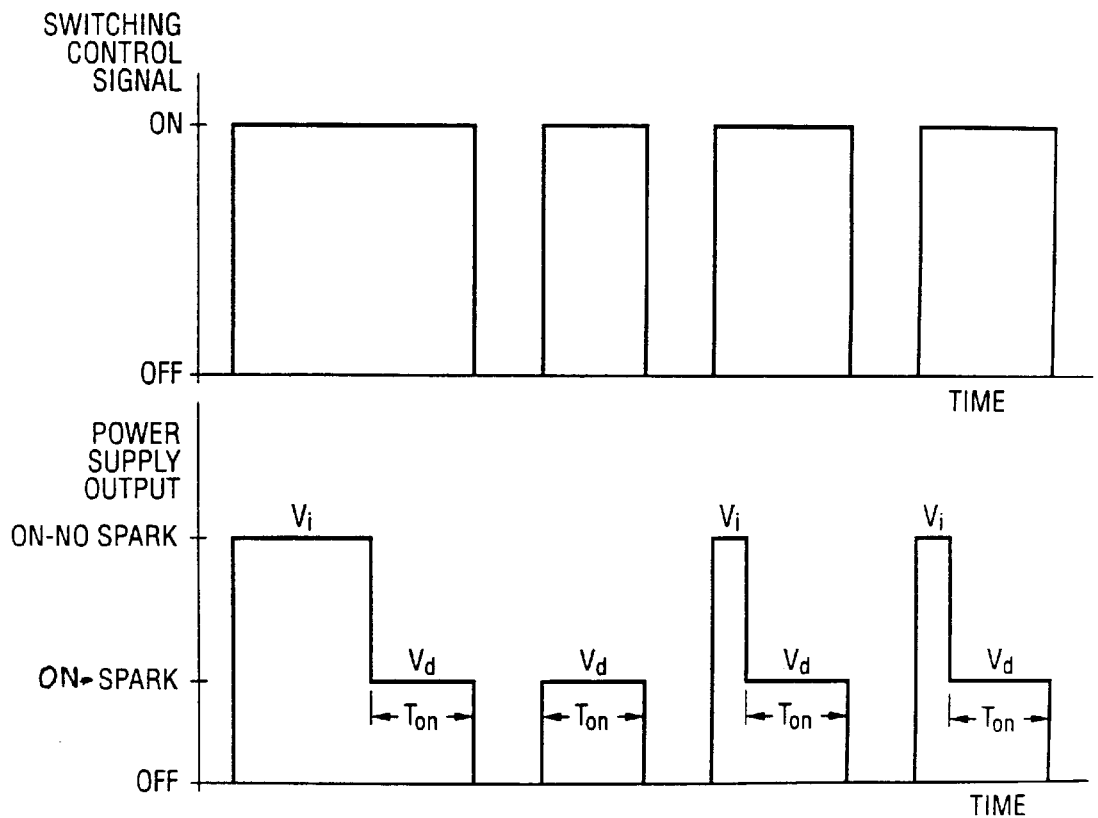
FIG. 5 are graphs illustrating the switching control and power output signals from the processor and the pulse source, respectively.

Referring now to FIGS. 4 and 5, the operation of processor 30 for controlling pulse source 36 in accordance with the present invention will now be described. Processor 30 includes a switching controller 70 operable with pulse source 36 for switching the voltage pulses on and off. Pulse source 36 applies the voltage pulses to electrode 20 and roll 12. In operation, switching controller 70 provides switching control signals as shown in FIG. 5 to pulse source 36. Pulse source 36 provides electrical power when the switching control signals are on and does not provide electrical power when the switching control signals are off.

Gap voltage monitor 46 monitors the voltage between electrode 20 and roll 12 to determine when sparking occurs. As shown in FIG. 5, there are three basic voltage conditions between electrode 20 and roll 12. First, an ignition voltage $V_i$ exists between electrode 20 and roll 12 when pulse source 36 is on and no sparking exists. Second, a discharge voltage $V_d$ exists between electrode 20 and roll 12 when pulse source 36 is on and sparking exists. The time period $T_{on}$ is the length of time that discharging is on and is the time period of the spark. Third, an off voltage $V_{off}$ exists between electrode 20 and roll 12 when pulse source 36 is off.

A feature of the present invention is that the time period $T_{on}$ of discharge is the same for each pulse regardless of the pulse duration. Thus, each pulse provides the same amount of sparking regardless of the time period of the pulse. To provide consistent spark duration, processor 30 includes a clock 72 operable with switching controller 70. Upon gap voltage monitor 46 detecting spark initiation, switching controller 70 in conjunction with clock 72 maintains pulse source 36 on until the expiration of a selected discharge period. At the end of the selected discharge period, switching controller 70 turns pulse source 36 off to stop the sparking. Switching controller 70 continues pulse application until sparking discharge and then terminates the pulse application after the expiration of the selected discharge period. Switching controller 70 then switches pulse source 36 on again to start a new spark.

Referring now to FIGS. 6 and 7, the on-off time control employed by processor 30 for a plurality of pulse sources will now be described. Typically, EDT machine 10 includes a set of pulse sources 36($a$–$b$) each associated with a respective set of electrodes 20($a$–$b$). Each set of electrodes 20($a$–$b$) may consist of a plurality of electrodes or just one electrode. Typically, each set of electrodes 20($a$–$b$) is placed on different head assemblies and located on opposite sides of roll 12. A feature of the present invention is that the sequencing between power channels is synchronized to minimize the power load of EDT machine 10 at any given time.

Specifically, as shown in FIG. 7, switching controller 70 controls pulse sources 36($a$–$b$) such that one of the pulse sources is on while the other pulse source is off. Switching controller 70 controls pulse sources 36($a$–$b$) to sequence the power in a controlled fashion. In operation, switching controller 70 controls pulse source 36$a$ to be on for a given duration and then turns the pulse source 36$a$ off. After the expiration of a selected time period from the time pulse source 36$a$ is turned off, switching controller 70 controls pulse source 36$b$ to be on for a given duration and then turns pulse source 36$b$ off. The process continues with switching controller 70 controlling pulse source 36$a$ to turn on after the expiration of a selected time period from the time pulse source 36$b$ is turned off.

Thus it is apparent that there has been provided, in accordance with the present invention, a method and apparatus for controlling the position and power of electrodes in an EDT machine that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An electric-discharge texturing (EDT) apparatus for texturing a roll, the apparatus comprising:

first and second electrodes;

a first power source for applying a voltage to the first electrode for promoting a spark between the first electrode and the roll to remove particles from the roll and produce a textured finish thereto;

a second power source for applying a voltage to the second electrode for promoting a spark between the second electrode and the roll to remove particles from the roll and produce a textured finish thereto; and a switching controller operable with the first and second power sources for applying respective voltages to the first and second electrodes, wherein the switching controller controls the first and second power sources such that the first power source applies a voltage to the first electrode while the second power source is off and the second power source applies a voltage to the second electrode while the first power source is off, wherein the switching controller controls the second power source to apply a voltage to the second electrode upon the expiration of a selected time period after the first power source has been off and controls the first power source to apply a voltage to the first electrode upon the expiration of the selected time period after the second power source has been off.

2. The apparatus of claim 1 further comprising:

an actuator associated with the first electrode for moving the first electrode away from and towards the roll to maintain a desired spacing between the first electrode and the roll;

a gap voltage monitor operable with the first electrode to provide a gap voltage monitor signal indicative of the voltage between the first electrode and the roll; and a processor for determining the spacing between the first electrode and the roll from the gap voltage monitor signal, the processor operable with the actuator to move the first electrode away from and towards the roll to increase and decrease the spacing between the first electrode and the roll to maintain a desired spacing between the first electrode and the roll, wherein the processor controls the actuator to move the first electrode at different speeds as a function of the spacing between the first electrode and the roll with respect to the sparking gap.

3. The apparatus of claim 1 further comprising:

a gap voltage monitor operable with the first electrode to provide a gap voltage monitor signal indicative of the voltage between the first electrode and the roll; and a processor for controlling the first power source to apply a voltage pulse to the first electrode and for processing the gap voltage monitor signal to determine when a spark is promoted between the first electrode and the roll, wherein the processor controls the power source to apply the voltage pulse until spark initiation and then controls the power source to maintain the voltage pulse for a selected time duration after spark initiation to provide a spark having the selected time duration between the first electrode and the roll.

* * * * *